Patented Aug. 31, 1926.

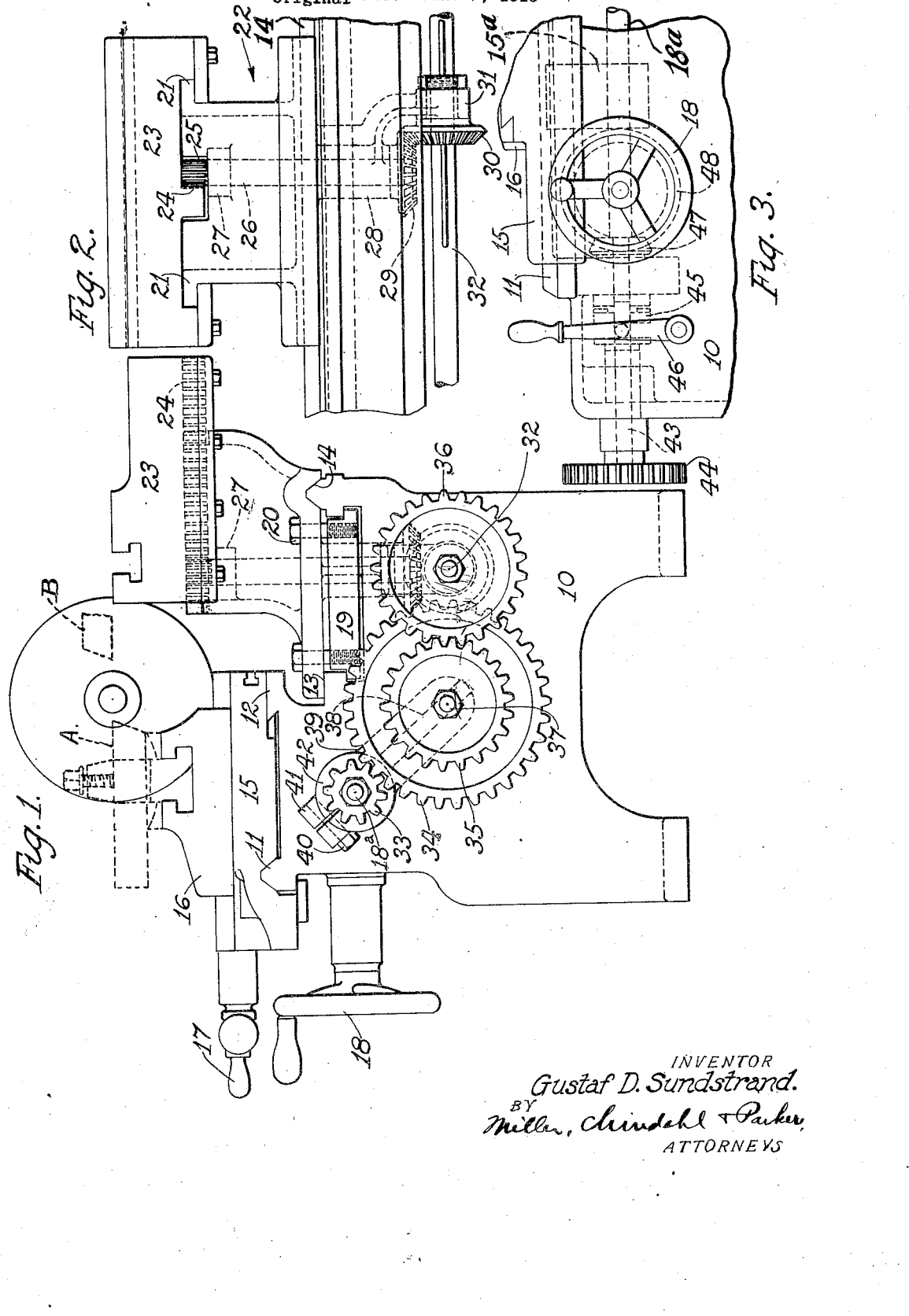

1,598,171

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

FEED MECHANISM FOR TOOL SUPPORTS FOR LATHES.

Application filed June 7, 1919, Serial No. 302,494. Renewed January 18, 1926.

My invention relates to lathes and more particularly to lathes of the general type illustrated in my copending application, Serial No. 212,393, filed January 18, 1918, having a double bed and two tool carriages.

One object of my invention is to provide an inexpensive and simple transmission for the operation of the tool on the rear tool carriage of said lathe.

Another object is to provide for ready adjustment of the transmission to secure different speed ratios between the movement of the front tool carriage and the rear tool carriage.

Still another object is to provide for positive actuation of said rear tool in either direction by power.

A special object is to arrange for the simultaneous actuation of both tools either by power or by hand.

Further objects and advantages of my invention will become apparent as the description proceeds.

In the accompanying drawings, Fig. 1 is an end view of a lathe illustrating an embodiment of my invention, the tail stock being omitted. Fig. 2 is a rear view of the rear tool carriage and associated parts. Fig. 3 is a fragmentary front view showing connections for actuating the front drive shaft.

In the drawings, 10 designates a lathe bed having a front set of ways 11 and 12 and a rear set 13 and 14. A tool carriage 15 is slidably mounted on the front ways and carries the usual transverse slide 16 operated by the handle 17. A denotes a tool carried by the front carriage 15. The carriage 15 may be connected in any well known manner to be fed by power or by the hand wheel 18. I have illustrated a drive shaft 18ᵃ operatively associated with a projection 15ⁿ (see Fig. 3) depending from the carriage 15 and adapted to be rotated by power or by the hand wheel 18 and by its rotation to actuate the carriage. The rear tool carriage is longitudinally slidable upon the rear ways 13 and 14 and may be clamped in adjusted position thereon by any suitable means such as a clamping plate 19 and bolts 20. Guideways 21 are formed at the top of the rear tool carriage 22 and guide and support a transverse slide 23 having the usual T-slot for the mounting of a cutting tool B.

Means are provided for feeding the rear tool toward and away from the center line of the lathe at a rate of speed bearing any desired ratio to the movement of the front tool carriage 15. A rack 24 projecting from the under surface of the transverse slide 23 engages a pinion 25 at the upper end of a vertical shaft 26 suitably journaled at 27 and 28 in the metal of the rear tool carriage. A bevel gear 29 is mounted on the lower end of the shaft and receives power from a similar bevel gear 30 rotatably mounted in a depending bracket 31 on the rear tool carriage and splined on the drive shaft 32. Power is transmitted to the rear drive shaft 32 from the pinion 33 mounted on the end of the drive shaft 18ᵃ for the front carriage through a gear 34 meshing with said pinion and a second gear 35 rotating with the first gear and meshing with a gear 36 on the rear drive shaft 32. The two intermediate gears 34 and 35 are mounted on a bolt 37 slidable in a slot 38 in a suitable arm 39 pivoted for rotation around the axis of the front drive shaft 18ᵃ and adapted to be clamped in adjusted position by a suitable screw 40 engaging lugs 41 on the split collar 42, carrying said arm 39. It will be seen that the four gears shown can be quickly and easily interchanged or removed and replaced by other gears to secure any desired ratio between the speed of the front tool carriage and the rear tool carriage, and that the rear tool may be positively driven in either direction.

In Fig. 3 I have illustrated one typical example of means for actuating the front drive shaft 18ᵃ either by power or by hand. Referring to this figure, it will be seen that the shaft 43 projects beyond the end of the lathe bed and carries a gear 44 adapted to be driven in either direction by power from any suitable source such for instance as that shown and described in my copending application, Serial No. 212,393 filed January 18, 1918. A clutch 45 controlled by a lever 46 is adapted to connect the projecting shaft 43 with the shaft 18ᵃ for driving the same by power. Keyed on the shaft 18ᵃ is a bevel gear 47 engaging another bevel 48 adapted to be rotated by the hand wheel 18. It will be seen that with the clutch 45 disconnected, the shaft 18ª may be manually operated at any time and that by means of the clutch power may be used to rotate the shaft.

The transmission I have disclosed is made up of relatively few parts of standard design, and is cheap to manufacture, easy to assemble, and serviceable in operation.

While I have shown and described a particular embodiment of my invention I desire the description to be considered as illustrative only and aim in the subjoined claims to cover all such legitimate modifications and improvements thereof as would naturally occur to a person skilled in the art, such, for instance, as the substitution of a worm and worm wheel for any of the intermeshing gears shown, or the addition of a worm and worm wheel at any convenient point for further speed reduction.

I claim as my invention:—

1. A lathe having, in combination, a front tool carriage, a front drive shaft for feeding the front tool carriage, a rear tool, a power connection from said front drive shaft to said rear tool, and means for actuating said front drive shaft either manually or by power.

2. A lathe having, in combination, a double bed, a tool carriage on the front portion of said bed, a rear tool mounted on the rear portion of said bed and means adapted to be actuated either manually or by power for control of said front carriage and said rear tool.

3. A lathe having, in combination, a double bed, a front tool and a rear tool carried by said double bed, a drive shaft for feeding said front tool, a power connection between said drive shaft and said rear tool for feeding the latter, and means for actuating said drive shaft manually or by power.

4. A lathe having, in combination, a double bed, a front tool and a rear tool, means for actuating said tools simultaneously by power, and manual means mounted on said lathe bed for simultaneous actuation of said tools.

5. A lathe having in combination, a double bed, a front tool and a rear tool on said bed, a longitudinal drive shaft adapted to be driven by power and to actuate both said tools, and a means mounted on said bed for manually driving said shaft.

6. A lathe having, in combination, a front carriage and an independently mounted rear tool, a single transmission adapted to actuate said carriage and tool, and means for actuating said transmission either manually or by power.

In testimony whereof, I have hereunto set my hand.

GUSTAF DAVID SUNDSTRAND.